UNITED STATES PATENT OFFICE.

SEIICHI SAKANE, OF KYOTO, JAPAN.

METHOD FOR TREATING SCALES OF FISH.

1,264,979.   Specification of Letters Patent.   Patented May 7, 1918.

No Drawing.   Application filed June 27, 1917.  Serial No. 177,296.

*To all whom it may concern:*

Be it known that I, SEIICHI SAKANE, subject of Japan, residing at No. 370 Moto-Shinnyodo Machi, Ichijo Dori, Shin Machi Nishieiru, Kyoto, Japan, have invented new and useful Improvements in Methods for Treating Scales of Fish, of which the following is a specification.

This invention relates to a method of treating scales of fish by which the scales are first made transparent, and then a flexible or hard substance. The object of this invention is to obtain a new article of industry from a material which has hitherto been considered utterly useless and thrown away. The scales treated according to my process can be given any desired color, gilt with metal powder or foil, or may be cut into any desired shape, and is a good substitute for glass, mother-of-pearl, mica, celluloid or the like; or they may be pasted into a thin plate and used for many purposes. The material obtained by my process is very strong but light, and is rich in elasticity. Moreover, the lines of growth peculiar to scales refract light and give very brilliant effects not seen in any other substance.

To carry my invention into effect, the following stages are necessary:—

First stage:—Take scales having regular shape and strong lines of growth, such as ctenoid scales, and wash them several times with fresh water. Then steep them in a solution in an ordinary temperature of half a pound of sodium carbonate in about three gallons of water for from five to eight hours. When the fatty matters have been removed from the scales and bad odor destroyed, take out the scales, rinse them with water and dry them.

Second stage:—Take the scales on which the first stage of my process has been completed, or soon after rinsing and before drying, and steep them in a cold bath of hydrochloric acid of about 5° Baumé for from five to fifty minutes. Then the lime salts contained therein will be dissolved, leaving practically only the organic matters, and the scales become thin and transparent pieces. This stage of the process requires a great vigilance. When the scales being treated have assumed required thickness and transparency and before the hydrochloric acid dissolves the gelatinous matter, they must be taken out, and washed several times with water, thus freeing them from the acid. They are then dried.

Third stage:—Steep the scales which have passed the second stage of the process in a 15 per cent. solution of formaldehyde for from one to three hours. Then the gelatinous matter will become an indissoluble hard substance. Then wash the scales well and dry. In this stage, instead of formaldehyde, may be used aluminium sulfate, tannic acid or any other acid having similar efficacy as formaldehyde.

Fourth stage:—Take the scales which have passed the second stage of this process and steep them in a bath containing about thirty per cent. of glycerin for about twenty-hours. Then the gelatinous matter will imbibe the glycerin and the scales will become a flexible substance something like india rubber. Then take out the scales, wash and dry them and polish their surfaces. In this stage, the same object can be achieved by using any other oil instead of glycerin.

Fifth stage:—When it is desired to dye or paint the scales, it can be done at any of the stages, but to have well fixed colors, it is best done in the second stage when the scales have become a transparent gelatinous substance and receive colors very easily, after which the scales can be subjected to the third, or fourth, stage of this process. When it is desired to form scales into plates, in scales of a large size they are pasted with one another in the way with which we roof a house with slates; and in scales of small size, in the way with which we make sheets of paper from pulp.

The above is a description of the process of my invention, but I wish it to be understood that any chemicals having similar efficacy as those herein mentioned may be used in their stead and their quantities and the time during which the scales are to be subjected, may be varied, without departing from the spirit of my invention.

I claim:

1. A method of treating scales of fish and obtaining therefrom a transparent celluloid-like substance, characterized by first treating any kind of fish scales with an alkali which removes all the fatty matters therefrom and destroys odors thereof, and then treating them with an acid not allowing the acid to destroy the natural lines of growth of the scales but to dissolve only the lime salts contained therein, thus causing only the organic matters to remain, substantially as and for the purposes hereinbefore set forth.

2. A method of treating scales of fish and obtaining therefrom celluloid-like substance, characterized by treating any kind of fish scales with an alkali which removes all the fatty matters therefrom and destroys all odors thereof, then treating the same with an acid which dissolves all the lime salts leaving only organic matters and thus making the lines of growth conspicuous, and then steeping the same in a condensing agent, substantially as and for the purposes hereinbefore set forth.

3. A method of treating scales of fish and obtaining therefrom celluloid-like substance, characterized by treating any kind of fish scales with an alkali which removes all the fatty matters therefrom and destroys all odors thereof, then treating the same with an acid which dissolves all the lime salts leaving only organic matters and thus making the lines of growth conspicuous, and then steeping the same in a condensing agent and a softening agent, substantially as and for the purposes hereinbefore set forth.

In testimony whereof I have signed my name to this specification in the presence of two subscribing witnesses.

SEIICHI SAKANE.

Witnesses:
ISUKE KABATA,
TAMAJIRO KITAJIMA.